R. L. STALANS.
CULTIVATOR.
APPLICATION FILED JUNE 17, 1908.
928,079.
Patented July 13, 1909.
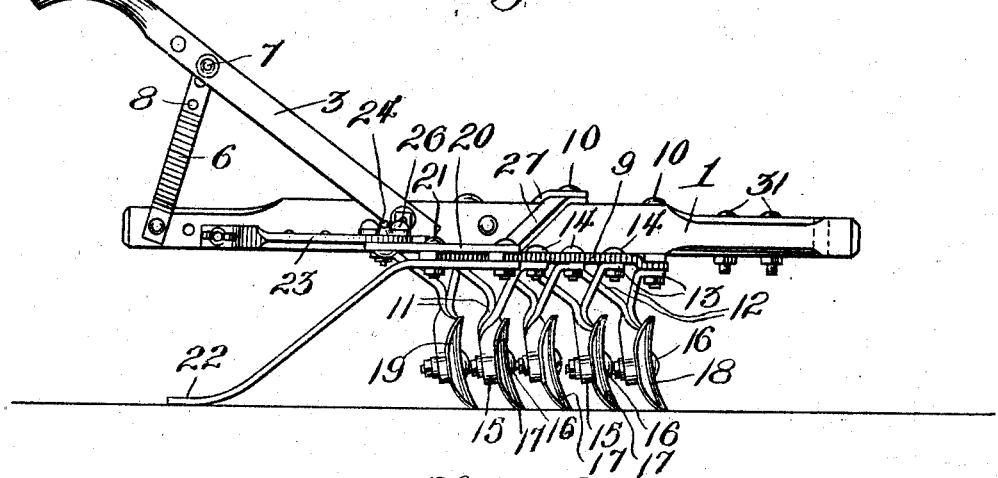
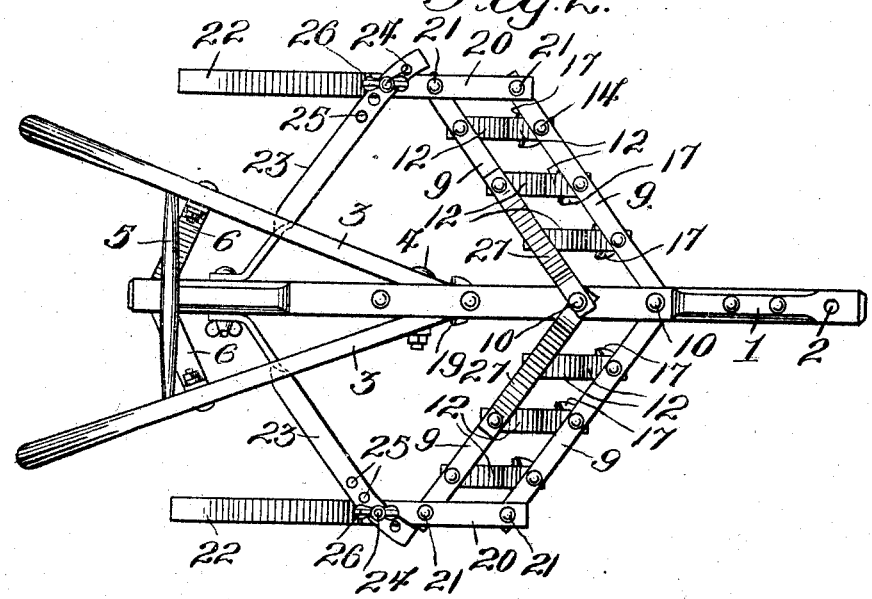
Witnesses
J. T. L. Wright
John F. Byrne
Inventor
Robert Lucius Stalans,
By Victor J. Evans
Attorney

UNITED STATES PATENT OFFICE.

ROBERT LUCIUS STALANS, OF NEWBURG, OKLAHOMA.

CULTIVATOR.

No. 928,079.  Specification of Letters Patent.  Patented July 13, 1909.

Application filed June 17, 1908. Serial No. 439,066.

*To all whom it may concern:*

Be it known that I, ROBERT LUCIUS STALANS, a citizen of the United States of America, residing at Newburg, in the county of Hughes and State of Oklahoma, have invented new and useful Improvements in Cultivators, of which the following is a specification.

My invention relates to improvements in cultivators, and its primary object is the provision of a device of this character which may be readily and quickly converted into a straddle row cultivator, which comprises comparatively few parts, which is durable and efficient, and which may be manufactured and sold at a comparatively low cost.

A further object of the invention is the provision of a cultivator wherein the shovels may be relatively adjusted to increase or decrease the area of soil to be cultivated on each trip of the machine across a field.

A still further object of the invention is the provision of a cultivator with means by which the depth of the penetration of the shovels can be regulated.

With the above and other objects in view, the invention consists in the construction, combination and arrangement of parts hereinafter fully described and claimed and illustrated in the accompanying drawing, wherein:

Figure 1 is a view in side elevation of a cultivator constructed in accordance with my invention. Fig. 2 is a top plan view thereof.

Referring to the drawing by reference numerals, 1 designates the main beam of the cultivator, which may be constructed of wood, or metal, and which is provided at a point adjacent its front end with an opening 2 to permit a suitably constructed clevis to be secured thereto. Handles 3 are secured at their front ends to the main beam 1 through the medium of a bolt 4, and their rear ends are secured in relatively spaced relation by means of a bar 5. The rear ends of the handles 3 are supported at a suitable elevation by means of bars 6, which are secured at their lower ends to the rear end of the main beam 1. The handles 3 are adjustably secured to the upper ends of the bars 6 by means of bolts 7 carried by the handles for passage through a horizontally alined pair of openings 8 arranged in series extending longitudinally of the bars.

Parallel pairs of shovel beams 9 are secured to the beam 1 in advance of the handles 3, one pair of shovel beams projecting in one direction, while the other pair projects in the opposite direction therefrom. The shovel beams are secured to the main beam through the medium of bolts 10, the connection between the beams being such that the shovel beams may be angularly adjusted with relation to the longitudinal center of the cultivator.

A plurality of stocks 11 are secured to the shovel beams 9, each pair of shovel beams being preferably provided with three stocks, and each stock comprises a pair of diverging arms 12 terminating in flanges 13. Bolts 14 are let through the shovel beams 9 and through the flanges 13 to secure the stocks 11 in applied position. The stocks 11 are provided with terminal eyes 15 adapted for the reception of bolts 16 adapted to secure shovels 17 to the stocks. The shovels may be of any well known or appropriate construction. A shovel 18 is secured to the under side of the main beam 1 between the innermost shovels 17, and a shovel 19 is secured to the main beam at a point in rear of the shovels 17 and 18.

Supports 20 are secured at their front ends to the shovel beams 9 by means of bolts 21. The supports 20 extend downwardly and rearwardly, their rear ends terminating in horizontal portions 22 which form runners. The supports 20 are constructed of any resilient material suitable for the purpose and are adapted to support the rear end of the cultivator and the outer ends of the shovel beams 9.

The shovel beams 9 are held in their adjusted positions through the medium of arms 23, which are secured at their inner ends to the main beam 1 and at their outer ends to the supports 20, the connection between the arms and the supports being established by means of bolts 24, a plurality of perforations 25 in the arms 23 and winged nuts 26 mounted upon the bolts 24. The shovel beams are also supported by bars 27 which are secured at their ends to the beams 9 and the main beam 1. The supports 20 are adapted to throw practically all of the weight of the cultivator upon the shovels, whereby to cause the shovels to penetrate the soil during the use of the cultivator. The depth of the penetration of the shovels can be adjusted by throwing more or less pressure acting in a downward direction on the handles 3, such pressure having the tendency to tilt the cultivator upwardly upon the runners 22 of the supports.

When it is desired to convert the cultivator into a straddle row cultivator, the shovels 18 and 19 and their stocks are removed, and a protector, not shown, is secured to the main beam 1, said protector occupying a position between the innermost of the shovels 17.

It should be apparent from the above description taken in connection with the accompanying drawings, that I provide a cultivator which may be readily and quickly converted into a straddle row cultivator, and which is simple, durable and efficient. It should also be apparent that the distance between the shovels may be varied so as to increase or decrease the area of the soil cultivated on each trip of the machine across a field and that the depth of penetration of the shovels may be easily and quickly regulated. As the supports 20 are constructed of resilient material, the cultivator may be manipulated to regulate the depth of penetration of the shovel without shock or jar.

The cultivator comprises comparatively few parts and the parts are so connected together that one or more may be readily removed and replaced.

Changes in the form, proportions and minor details of construction may be made within the scope of the claim without departing from the spirit or sacrificing any of the advantages of the invention.

Having fully described and illustrated my invention, what I claim is:

A cultivator comprising a main beam, handles secured to the main beam, shovel beams pivotally secured at their inner ends to and projecting laterally in opposite directions from the main beam, shovels secured to the shovel beams, resilient supports secured at their upper ends to the outer ends of the shovel beams and extending downwardly and rearwardly from such beams, the free ends of the supports terminating in horizontally disposed portions which form runners, and bars secured at their inner ends to the main beam and adjustably secured at their outer ends to the supports.

In testimony whereof I affix my signature in presence of two witnesses.

ROBERT LUCIUS STALANS.

Witnesses:
   N. C. MOORE,
   E. B. RITTER.